(12) United States Patent
Tepper (10) Patent No.: US 8,873,748 B2
(45) Date of Patent: *Oct. 28, 2014

(54) UNIQUE SURROGATE KEY GENERATION USING CRYPTOGRAPHIC HASHING

(71) Applicant: International Business Machines Corporation, Armonk, NY (US)

(72) Inventor: Clinton S. Tepper, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,742

(22) Filed: Nov. 27, 2012

(65) Prior Publication Data

US 2013/0114809 A1 May 9, 2013

Related U.S. Application Data

(63) Continuation of application No. 12/624,547, filed on Nov. 24, 2009, now Pat. No. 8,369,523.

(51) Int. Cl.
 *H04L 29/06* (2006.01)
 *H04L 9/08* (2006.01)
 *G06F 17/30* (2006.01)
(52) U.S. Cl.
 CPC .......... *H04L 9/0861* (2013.01); *G06F 17/3033* (2013.01)
 USPC .......................................................... 380/44
(58) Field of Classification Search
 USPC .......................................................... 380/44
 See application file for complete search history.

(56) References Cited

U.S. PATENT DOCUMENTS

| 6,163,774 | A | 12/2000 | Lore et al. |
| 7,373,345 | B2 * | 5/2008 | Carpentier et al. ................... 1/1 |
| 7,497,370 | B2 | 3/2009 | Allen et al. |
| 7,500,150 | B2 | 3/2009 | Sharma et al. |
| 7,580,944 | B2 | 8/2009 | Zhuge et al. |
| 7,720,219 | B1 | 5/2010 | Olson et al. |
| 7,751,567 | B2 | 7/2010 | Quick, Jr. et al. |
| 2003/0002666 | A1 * | 1/2003 | Takahashi ........................ 380/42 |
| 2005/0254658 | A1 | 11/2005 | Brown et al. |
| 2007/0127457 | A1 | 6/2007 | Mirtorabi et al. |
| 2008/0208897 | A1 | 8/2008 | Lew et al. |
| 2009/0070237 | A1 | 3/2009 | Lew et al. |
| 2010/0076937 | A1 * | 3/2010 | Abdelnur et al. ............. 707/679 |
| 2011/0113037 | A1 | 5/2011 | Wessling et al. |

OTHER PUBLICATIONS

Federal Information Processing Standards Publiation 180-2, "Secure Hash Standard", Aug. 1, 2002, National Institue of Standards and Technology.*

(Continued)

*Primary Examiner* — Michael S McNally
(74) *Attorney, Agent, or Firm* — John Pivnichny; Keohane & D'Alessandro, PLLC (57) ABSTRACT

The present invention relates to a method or system of generating a surrogate key using cryptographic hashing. One embodiment of the method of the present invention may have steps such as selecting a field or group of fields that is or are unique among all records in the database and for each record, extracting the data from the fields; concatenating the extracted data into an input message; running the input message through a hash generator, either in batches or one at a time, for testing purposes perhaps; and outputting a surrogate key.

20 Claims, 5 Drawing Sheets

(56) References Cited

OTHER PUBLICATIONS

Ralph Kimball, Surrogate Keys, May 1998, http://www.kimballgroup.com/html/articles_search/articles1998/9805d05.html, retrieved on May 29, 2012, 4 pages.

Encrypt: All you need to know about encryption. Best resource for encryption on the web, 2009, http://www.encrypt.ro/2009/06, retrieved on May 31, 2012, 6 pages.

Little endian vs. big endian, Apr. 2008, http://www.joerch.org/thoughts/endian.html, retrieved May 31, 2012, 1 page.

R. Rivest, RFC1321: The MD5—Message Digest Algorithm, MIT Laboratory for Computer Science and RSA Data Security, Inc., Apr. 1992, http://tools.ietf.org/html/rfc1321, 22 pages.

Dorianne Alvarado-David, USPTO Office Action, U.S. Appl. No. 12/624,547, Mail Date Jun. 7, 2012, 53 pages.

Dorianne Alvarado-David, USPTO Notice of Allowance and Fee(s) Due, U.S. Appl. No. 12/624,547, Date Mailed Sep. 24, 2012, 13 pages.

* cited by examiner

UNIQUE SURROGATE KEY GENERATION USING CRYPTOGRAPHIC HASHING

RELATED U.S. APPLICATION DATA

The present patent document is a continuation of U.S. patent application Ser. No. 12/624,547, filed Nov. 24, 2009, entitled "SURROGATE KEY GENERATION USING CRYPTOGRAPHIC HASHING, the disclosure of which is incorporated herein by reference.

TECHNICAL FIELD

The present invention relates generally to surrogate key generation and, more specifically, to a method or system of deterministically generating a surrogate key using cryptographic hashing.

BACKGROUND

A surrogate key in a database is a unique identifier for either an entity in the modeled world or an object in the database. The surrogate key is not derived from application data. The problem is to deterministically generate a fixed length surrogate key without collisions. A collision or clash is a situation that occurs when two distinct pieces of data have the same hash value, checksum, fingerprint, or cryptographic digest. A cryptographic digest is a deterministic procedure that takes an arbitrary block of data and returns a fixed-size bit string, the cryptographic digest, such that an accidental or intentional change to the data will change the hash value. The data to be encoded is often called the "message", and the hash values are sometimes called the message digest or, simply, digest.

The ideal cryptographic hash function has four main properties:
  it is easy to compute the hash value for any given message,
  it is infeasible to find a message that has a given hash,
  it is infeasible to modify a message without changing its hash, and
  it is infeasible to find two different messages with the same hash.

Collisions may be unavoidable whenever members of a very large set (such as all possible person names, or all possible computer files) are mapped to a relatively short bit string.

Prior art systems and methods tend to use variable length keys and may not be deterministic. That is, for sequential solutions of the prior art to the surrogate key problem, a key generated for two identical records may create two separate keys.

Therefore, there is a need to solve the problems associated as described above.

SUMMARY

The deterministic method and system of the present invention may generate identical keys for identical records, thereby validating the data quality within a record and reducing data redundancy.

The present invention provides a method for generating a surrogate key using cryptographic hashing in a system having a database having records, the records having fields having data therein, the method comprising: selecting a field that is unique among all records in the database and for each record, extracting the data from the fields; concatenating the extracted data into an input message; inputting the input message to a hash generator to perform the following steps: dividing the input message into a set of chunks; dividing each chunk into a first set of words; generating a second set of words based on the first set of words; generating a third set of words based on the second set of words; and generating final results for each message based on the third set of words; and outputting a surrogate key based on the final results.

A first aspect of the present invention may include a method for generating a surrogate key using cryptographic hashing in a system having a database having records, the records having fields having data therein, the method comprising: selecting a field that is unique among all records in the database and for each record, extracting the data from the fields; concatenating the extracted data into an input message; inputting the input message to a hash generator to perform the following steps: dividing the input message into a set of chunks; dividing each chunk into a first set of words; generating a second set of words based on the first set of words; generating a third set of words based on the second set of words; and generating final results for each message based on the third set of words; and outputting a surrogate key based on the final results.

A second aspect of the present invention may further include a system for generating a surrogate key using cryptographic hashing comprising: at least one processing unit; memory operably associated with the at least one processing unit; and a key generation system storable in memory and executable by the at least one processing unit, the key generation system comprising: a selecting component configured to select a field that is unique among all records in the database; an extracting component configured to extract the data from the fields for each record; a concatenating component configured to concatenate the extracted data into an input message; a hash generator configured to hash the input message by performing the following: dividing the input message into a set of chunks; dividing each chunk into a first set of words; generating a second set of words based on the first set of words; generating a third set of words based on the second set of words; and generating final results for each message based on the third set of words; and an outputting component configured to output a surrogate.

A third aspect of the present invention may further provide computer program product embodied in a computer readable storage device for operating in a system comprising a processing unit, a memory, a bus, input/output (I/O) interfaces, an application, the computer program product for implementing a method in a system for generating a surrogate key using cryptographic hashing, the method comprising: selecting a field that is unique among all records in the database and for each record, extracting the data from the fields; concatenating the extracted data into an input message; inputting the input message to a hash generator to perform the following steps: dividing the input message into a set of chunks; dividing each chunk into a first set of words; generating a second set of words based on the first set of words; generating a third set of words based on the second set of words; and generating final results for each message based on the third set of words; and outputting a surrogate key based on the final results.

A fourth aspect of the present invention may further include method for deploying a computer infrastructure comprising integrating computer-readable code into a computing system, wherein the code in combination with the computing system is capable of performing a process for generating a surrogate key using cryptographic hashing, the process comprising: selecting a field that is unique among all records in the database and for each record, extracting the data from the fields; concatenating the extracted data into an input message;

inputting the input message to a hash generator to perform the following steps: dividing the input message into a set of chunks; dividing each chunk into a first set of words; generating a second set of words based on the first set of words; generating a third set of words based on the second set of words; and generating final results for each message based on the third set of words; and outputting a surrogate key based on the final results.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION

Exemplary embodiments will now be described more fully herein with reference to the accompanying drawings, in which exemplary embodiments are shown. Embodiments of the invention provide an approach for selecting a resource to develop a component in a Unified Modeling Language (UML) software system architecture. Specifically, a request for a developer resource is received from an architect. A component for the resource is determined and candidate analytics is performed on the component. Based on the candidate analytics, a list of potential candidates is presented to the architect. A developer resource is then selected from the list of candidates.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

The present invention comprises a system and method for generating a surrogate key using cryptographic hashing. The system and method of the present invention provides for a method wherein several steps should be followed.

1) Selecting a field or group of fields that are unique among all records being put in the database. The length of the records does not matter, only the uniqueness.

2) For each record, extracting the data from these fields and concatenating them into an input message.

3) Running the input message through a hash generator either in batches or, for test purposes one at a time.

4) Outputting a surrogate key.

Essentially the hash key generator deterministically generates a fixed length unique surrogate key from variable length concatenated input fields.

Figure 1:
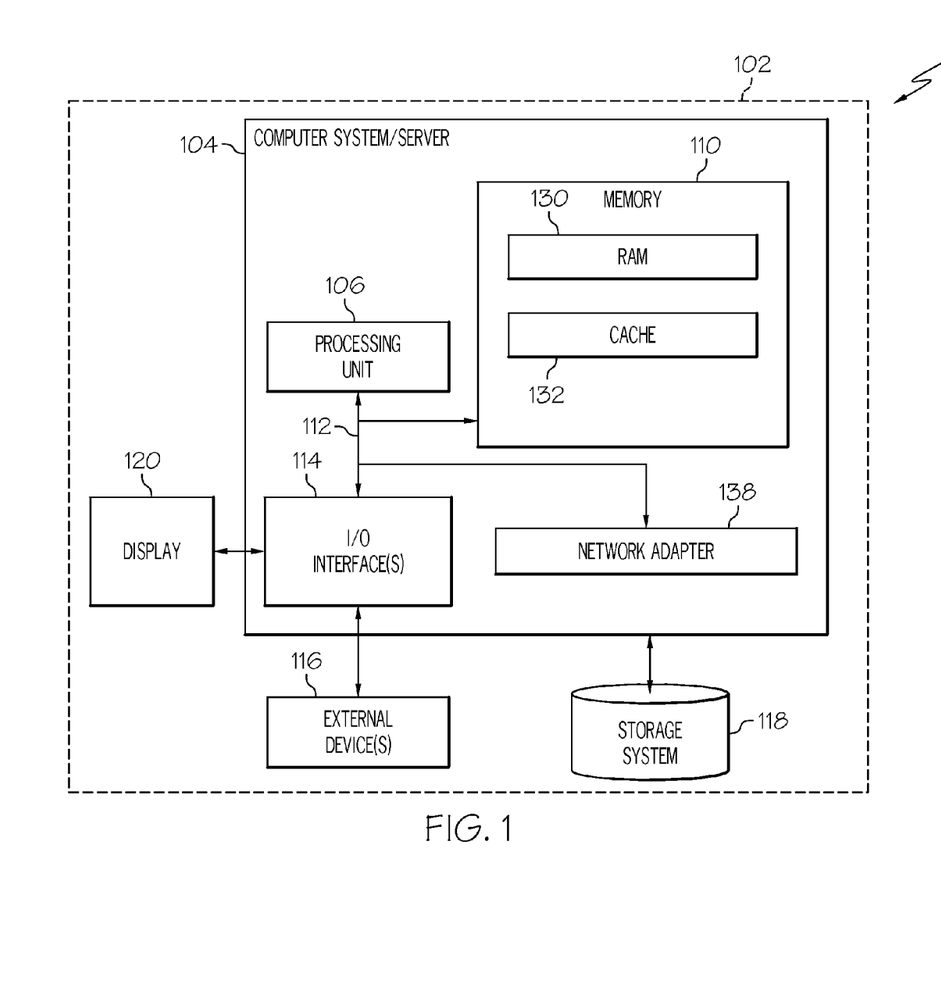
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 and video camera (not shown) or other peripheral devices for providing a user an interface to computer system 104 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order, that is, at random. Storage system 118 may take the form of tapes, magnetic discs and optical discs and are generally used for long term storage of data. Cache 132 is a memory for storing a collection of data—duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
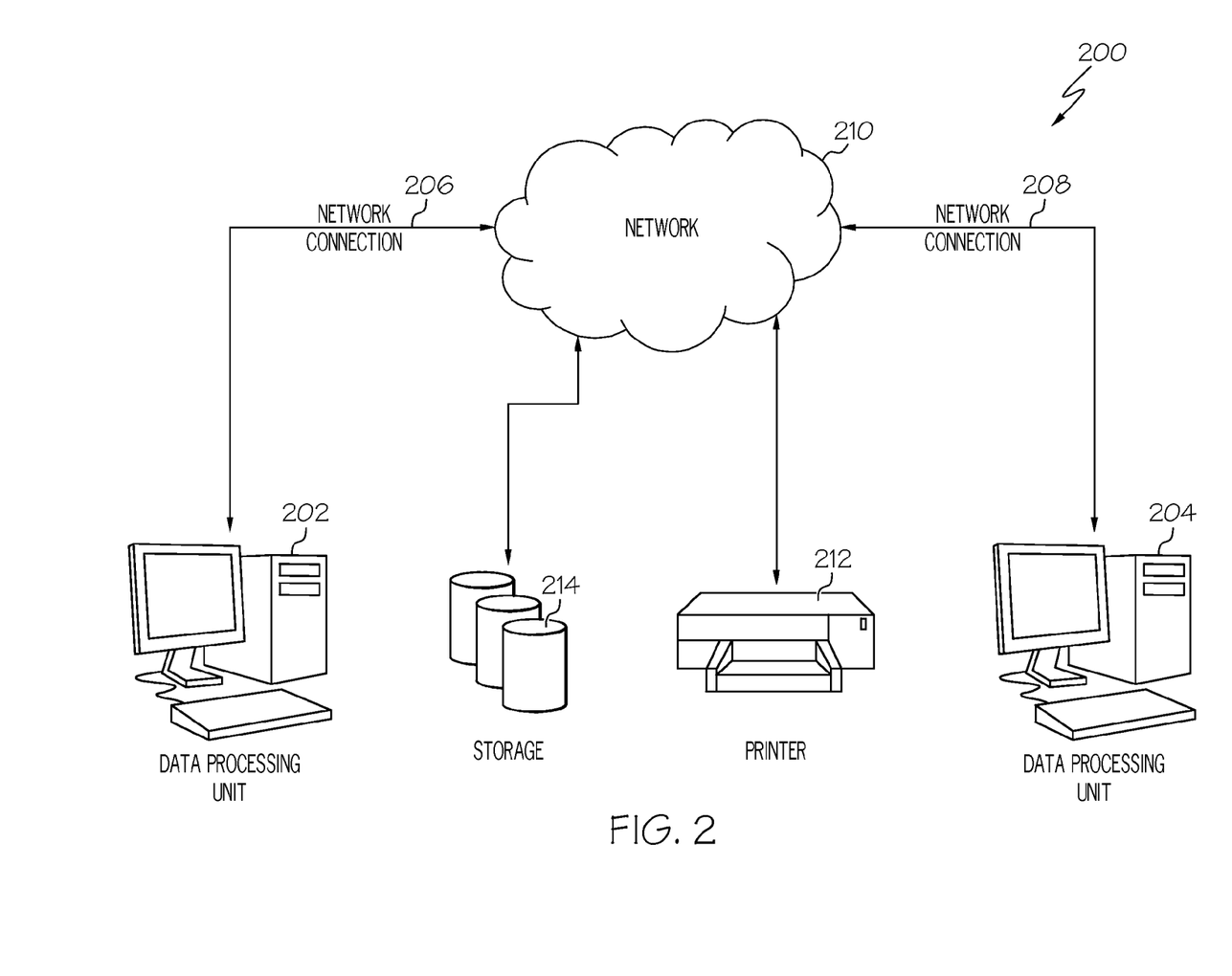
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, for instance, of a local area network (LAN) or internetwork. Printer 212 and storage 214 may be connected to network 210 via network connections 206 and 208. Basic network components may include network interface cards, repeaters, hubs, bridges, switches, and routers. Data processing units 202 and 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used, but any application for retrieving, presenting, and traversing information resources on the Internet must be considered.

Figure 3:
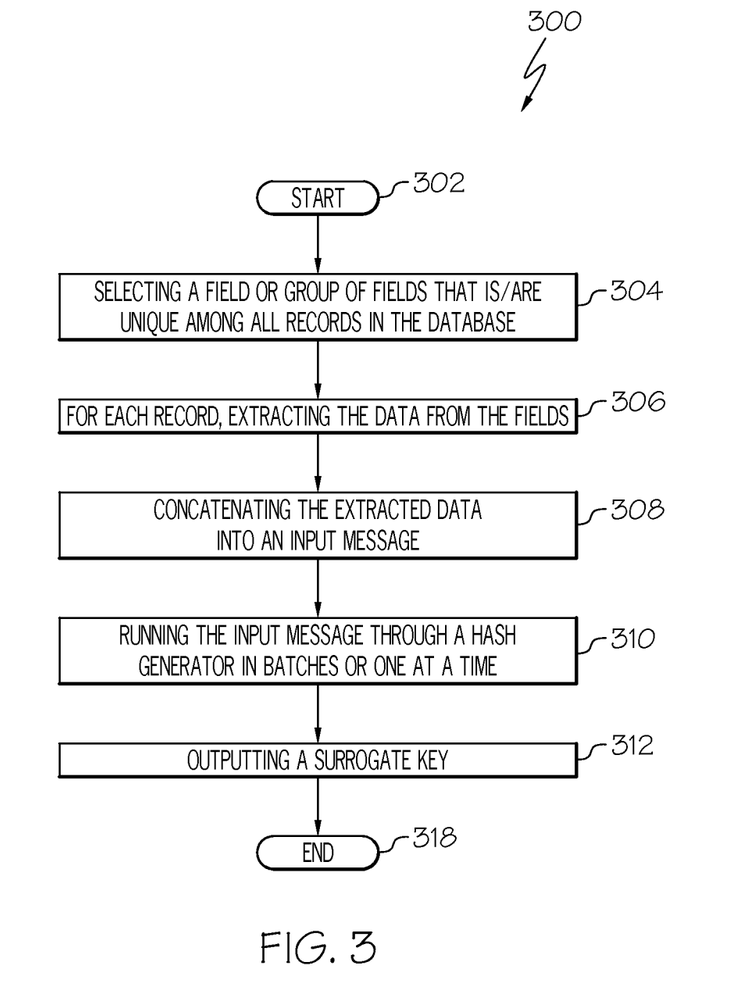
FIG. 3 illustrates an embodiment of a method of the present invention.

An embodiment 300 of the method of the present invention is shown in FIG. 3 which starts at 302. To use this methodology, several steps must be followed.

At 304, a field (or a group of fields) is/are selected that is/are unique among all records in the database. At 306, for each record, the data is extracted from the fields. At 308, the extracted data is concatenated into an input message. At 310, the input message is run through a hash generator in batches or one at a time for testing purposes. At 312, a surrogate key is output and the method ends at 318.

Essentially the hash key generator deterministically generates a fixed length unique surrogate key from variable length concatenated input fields.

Key points are:
- The keys are collision proof, as long as the input text is unique. Two different inputs produce two different outputs; two of the same inputs produce the same outputs.
- The length of the input message is arbitrary. It could be a word, it could be a book.
- The algorithm is an implementation of the National Security Administration's SHA224 cryptographic hashing algorithm. The algorithm is public domain, and the implementation is of the present invention. The output message is 224 bit binary. This could be typecast to any desired data type.

Figure 4:
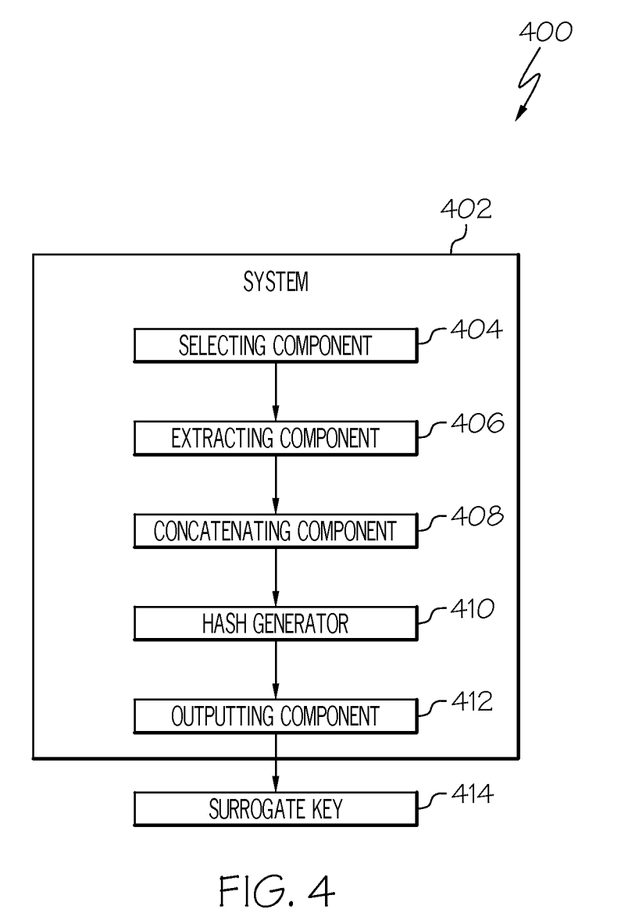
FIG. 4 illustrates an embodiment of a system of the present invention.

FIG. 4 shows a network system 400 for implementing an embodiment of the present invention. As shown, network system 400 includes system 402 which may include the following components: selecting component 404, extracting component 406, concatenating component 408, hash generator 410, and outputting component 412. System 402 may output surrogate key 414.

Figure 5:
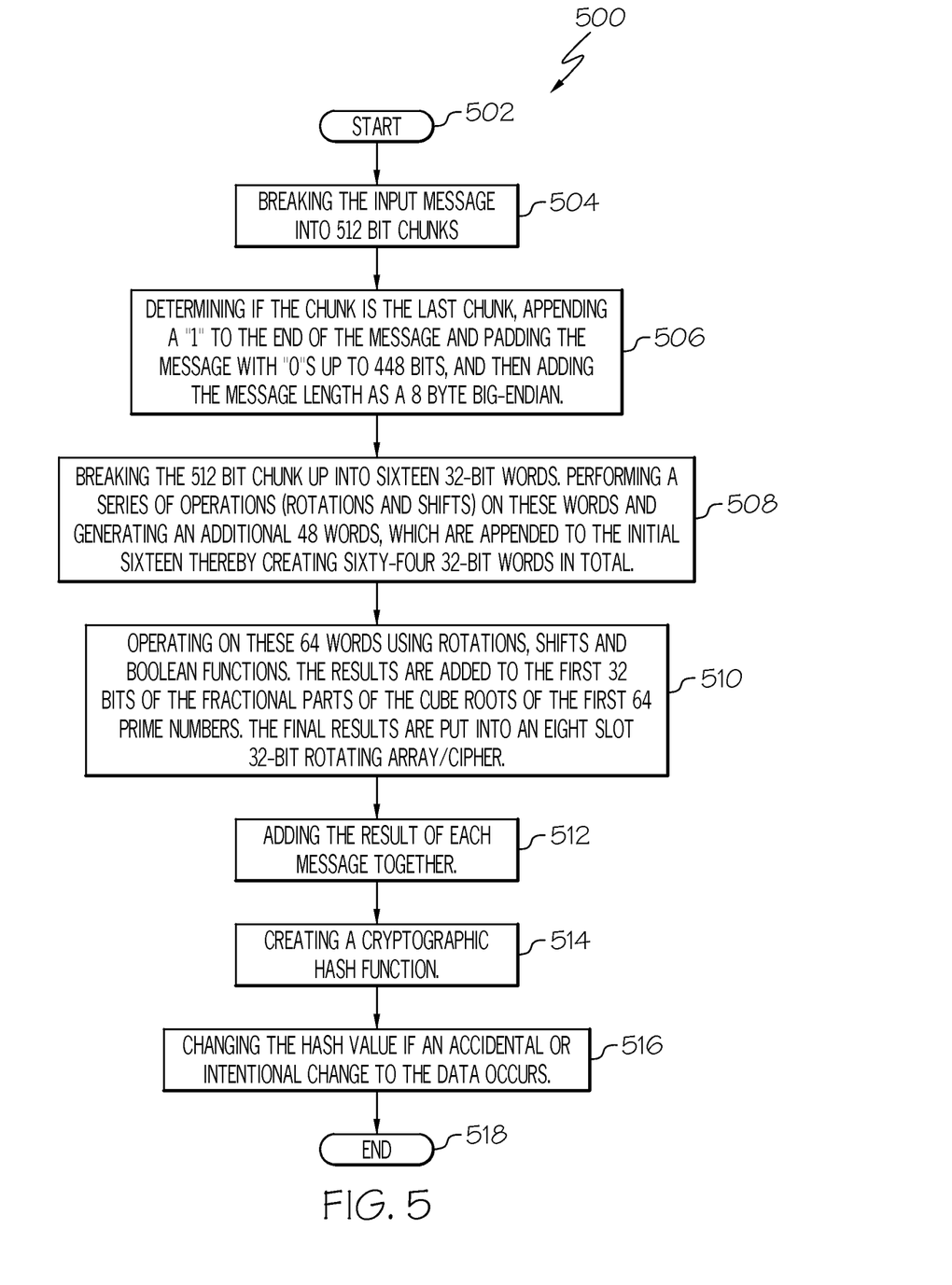
FIG. 5 illustrates another embodiment of the method of the present invention.

FIG. 5 illustrates an embodiment 500 of the method of the present invention that starts at 502:
1. At 504, an "eat" function breaks the input message into 512 bit chunks and runs the following steps on each chunk:
   a. At 506, the system determines if the chunk is the last chunk, and if the chunk is the last chunk, a "1" is appended to the end of the message and the message is padded with "0"s up to 448 bits, where the message length as a 8 byte big-endian is added. Endianness is the byte (and sometimes bit) ordering used to represent some kind of data. Typical cases are the order in which integer values are stored as bytes in computer memory (relative to a given memory addressing scheme) and the transmission order over a network or other medium. When specifically talking about bytes, endianness is also referred to simply as byte order. The usual contrast is between most significant byte (or bit) first, called big-endian, and least significant byte (or bit) first, called little-endian.
   b. The 512 bit chunk is broken up into sixteen 32-bit words at 508. A series of operations (rotations and shifts) are performed on these words that generate an additional 48 words, which are appended to the initial sixteen, creating sixty-four 32-bit words in total.
   c. At 510, the algorithm operates on these 64 words using rotations, shifts and Boolean functions. The results are added to the first 32 bits of the fractional parts of the cube roots of the first 64 prime numbers. The final results are put into an eight slot 32-bit rotating array/cipher.
2. At 512, the algorithm adds the result of each message together (that is, the final array of eight 32-bit words).
3. At 514, a cryptographic hash function is created using the first seven words. A cryptographic hash function is a deterministic procedure that takes an arbitrary block of data and returns a fixed-size bit string, the (cryptographic) hash value, such that an accidental or intentional change to the data will change the hash value such as at 516. The method ends at 518.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for generating a surrogate key using cryptographic hashing in a system having a database having records, the records having fields having data therein, the method comprising:
   selecting a field that is unique among all records in the database and for each record, extracting the data from the fields;
   concatenating the extracted data to a predetermined length to yield an input message;
   inputting the input message to a hash generator to perform the following steps:
      dividing the input message into a set of chunks;
      dividing each chunk into a first set of words;
      generating a second set of words based on the first set of words;
      generating a third set of words based on the second set of words; and generating final results for each message based on the third set of words; and outputting a surrogate key based on the final results, wherein the surrogate key for each record has an identical fixed length and wherein sequential generations of the surrogate key for an identical record by the hash generator yield identical results.

2. The method of claim 1, wherein generating final results for each message comprises, for each of the third set of words, adding the first 32 bits of the fractional parts of the cube roots of the first 64 prime numbers.

3. The method of claim 1, wherein dividing the input message comprises dividing the input message into a predefined number of 512 bit chunks and dividing each bit chunk comprising dividing each chunk into a predefined number of 32 bit words.

4. The method of claim 1, wherein generating a second set of words comprises rotating and shifting the first set of words and generating additional words and appending the additional words to the first set of words to form a second set of words.

5. The method of claim 1, wherein generating a third set of words comprises operating on the second set of words using at least one of rotations, shifts, or Boolean functions.

6. The method of claim 1, further comprising putting the final results for each message into an eight slot 32-bit rotating array/cipher.

7. The method of claim 1, further comprising putting the final results for each message together and providing the first set of words as a resulting cryptographic hash value, the first set of words having a predefined number of words.

8. A system for generating a surrogate key using cryptographic hashing comprising:
at least one processing unit;
memory operably associated with the at least one processing unit; and
a key generation system storable in memory and executable by the at least one processing unit, the key generation system comprising:
a selecting component configured to select a field that is unique among all records in the database;
an extracting component configured to extract the data from the fields for each record;
a concatenating component configured to concatenate the extracted data to a predetermined length to yield an input message;
a hash generator configured to hash the input message by performing the following:
dividing the input message into a set of chunks;
dividing each chunk into a first set of words;
generating a second set of words based on the first set of words;
generating a third set of words based on the second set of words; and
generating final results for each message based on the third set of words; and
an outputting component configured to output a surrogate key, wherein the surrogate key for each record has an identical fixed length and wherein sequential generations of the surrogate key for an identical record by the hash generator yield identical results.

9. The system of claim 8, wherein generating final results for each message comprises, for each of the third set of words, adding the first 32 bits of the fractional parts of the cube roots of the first 64 prime numbers.

10. The system of claim 8, wherein dividing the input message comprises dividing the input message into a predefined number of 512 bit chunks and dividing each bit chunk comprises dividing each chunk into a predefined number of 32 bit words.

11. The system of claim 8, wherein generating a second set of words comprises comprising rotating and shifting the first set of words and generating additional words and appending the additional words to the first set of words to form a second set of words.

12. The system of claim 8, wherein generating a third set of words comprises operating on the second set of words using at least one of rotations, shifts, or Boolean functions.

13. The system of claim 8, the hash generator further configured to hash the input message by putting the final results for each message into an eight slot 32-bit rotating array/cipher.

14. The system of claim 8, the hash generator further configured to hash the input message by putting the final results for each message together and providing the first set of words as a resulting cryptographic hash value, the first set of words having a predefined number of words.

15. A computer program product embodied in a computer readable storage device for operating in a system comprising a processing unit, a memory, a bus, input/output (I/O) interfaces, an application, the computer program product for implementing a method in a system for generating a surrogate key using cryptographic hashing, the method comprising:
selecting a field that is unique among all records in the database and for each record, extracting the data from the fields;
concatenating the extracted data to a predetermined length to yield an input message;
inputting the input message to a hash generator to perform the following steps:
dividing the input message into a set of chunks;
dividing each chunk into a first set of words;
generating a second set of words based on the first set of words;
generating a third set of words based on the second set of words; and
generating final results for each message based on the third set of words; and
outputting a surrogate key based on the final results, wherein the surrogate key for each record has an identical fixed length and wherein sequential generations of the surrogate key for an identical record by the hash generator yield identical results.

16. The computer program product of claim 15, wherein generating final results for each message comprises, for each of the third set of words, adding the first 32 bits of the fractional parts of the cube roots of the first 64 prime numbers.

17. The computer program product of claim 15, wherein dividing the input message comprises dividing the input message into a predefined number of 512 bit chunks and dividing each bit chunk comprises dividing each chunk into a predefined number of 32 bit words.

18. The computer program product of claim 15, wherein generating a second set of words comprises comprising rotating and shifting the first set of words and generating additional words and appending the additional words to the first set of words to form a second set of words.

19. The computer program product of claim 15, wherein generating a third set of words comprises operating on the second set of words using at least one of rotations, shifts or Boolean functions.

20. A method for deploying a computer infrastructure comprising integrating computer-readable code into a computing system, wherein the code in combination with the computing system is capable of performing a process for generating a surrogate key using cryptographic hashing, the process comprising:
- selecting a field that is unique among all records in the database;
- for each record, extracting the data from the fields;
- concatenating the extracted data to a predetermined length to yield an input message;
- inputting the input message to a hash generator to perform the following steps:
  - dividing the input message into a set of chunks;
  - dividing each chunk into a first set of words;
  - generating a second set of words based on the first set of words;
  - generating a third set of words based on the second set of words; and
  - generating final results for each message based on the third set of words; and
- outputting a surrogate key based on the final results, wherein the surrogate key for each record has an identical fixed length and wherein sequential generations of the surrogate key for an identical record by the hash generator yield identical results.

* * * * *